March 27, 1956     C. J. EDWARDS, JR     2,739,486
WHEEL-AND-CHAIN DRIVE

Filed April 3, 1953     2 Sheets-Sheet 1

INVENTOR.
CYRIL J. EDWARDS JR.
BY
Gregory S. Dolgorukov
ATTORNEY.

March 27, 1956  C. J. EDWARDS, JR  2,739,486
WHEEL-AND-CHAIN DRIVE
Filed April 3, 1953  2 Sheets-Sheet 2

INVENTOR.
CYRIL J. EDWARDS JR.
BY
Gregory S. Dolgorukov
ATTORNEY.

United States Patent Office 2,739,486
Patented Mar. 27, 1956

2,739,486

WHEEL-AND-CHAIN DRIVE

Cyril J. Edwards, Jr., Detroit, Mich.

Application April 3, 1953, Serial No. 346,675

2 Claims. (Cl. 74—250)

This invention relates to mechanical means for transmitting power, and more particularly to an improved wheel-and-chain drive. The present application is a continuation-in-part of my co-pending application Serial No. 140,498, filed on January 25, 1950, for Wheel and Chain Drive.

It is now well appreciated by those skilled in the art that in instances where it is required to connect shafts which are too far apart for gearing, and not far enough for belt, and in places where positive connection is desired, particularly where the drive has to operate in mud or oil, use of the wheel-and-chain drives offers distinct advantages. Instances of such applications are found in motors driving heavy machine tools; in trucks; agricultural machinery; bicycles; and in numerous other types of applications.

Accordingly, many designs of wheel-and-chain drives have been developed, mostly of the so-called sprocket wheel and chain type, in which the driving and the driven wheels are provided with projections or teeth on their rims, so arranged as to engage the links of a chain having engageable elements in the form of rollers or teeth. One of the most serious disadvantages of such constructions was found to be in the cost of casting or machining of the sprocket wheel projections which for the proper operation of the chain must be of certain definite profile, as well as machining parts of the chain itself, particularly chains of the tooth type. Another disadvantage of prior constructions was found to be in the excessive weight thereof, due in part to the large number of rollers on chains of the roller type.

One of the objects of the present invention is to provide wheel-and-chain drive whereby the above mentioned and other disadvantages of prior constructions are overcome and largely eliminated, and light, strong and inexpensive construction is provided.

Another object of the invention is to provide an improved wheel-and-chain drive in which the engageable elements of the wheel are in the form of rollers or pins, while the engageable elements of the chain are of the tooth type.

A further object of the invention is to provide an improved wheel-and-chain drive in which both the wheel and the chain are made of sheet material by stamping operations, thereby ensuring lightness and lost cost of manufacturing.

A still further object of the invention is to provide an improved wheel-and-chain drive which while being made by stamping from relatively thin sheet metal is strong, rigid, and has ample bearing areas at places where wearing loads are exerted, thus preventing occurrence of excessive localized friction.

A still further object of the present invention is to provide an improved wheel-and-chain drive, in which the chain is made by stamping from sheet metal and yet has very little elongation or stretch, thereby maintaining constant or nearly constant pitch in the chain and ensuring proper load distribution on the rollers of the wheel.

It is an added object of the present invention to provide an improved wheel-and-chain drive which is simple and rugged in construction, safe and dependable in operation, and is relatively inexpensive to manufacture.

Further objects and advantages of the invention will be apparent from the following description, taken in connection with the appended drawings, in which.

It is to be understood that the invention is not limited in its application to the details of construction and arrangement of parts illustrated in the accompanying drawings, since the invention is capable of other embodiments and of being practiced or carried out in various ways. Also it is to be understood that the phraseology and terminology employed herein is for the purpose of description and not of limitation.

In accordance with the invention I provide an improved wheel-and-chain drive comprising a wheel adapted to be manufactured partly by screw machine methods and partly by stamping methods. I also provide a chain adapted to be manufactured by stamping operations from relatively thin sheet material, such for instance as sheet steel, with the addition of parts easily produced by screw machine methods. Thus, both the wheel and the chain are manufactured by two methods highly developed by the industry for high quantity and lost cost production, ensuring low cost and interchangeability of parts.

Figure 1:
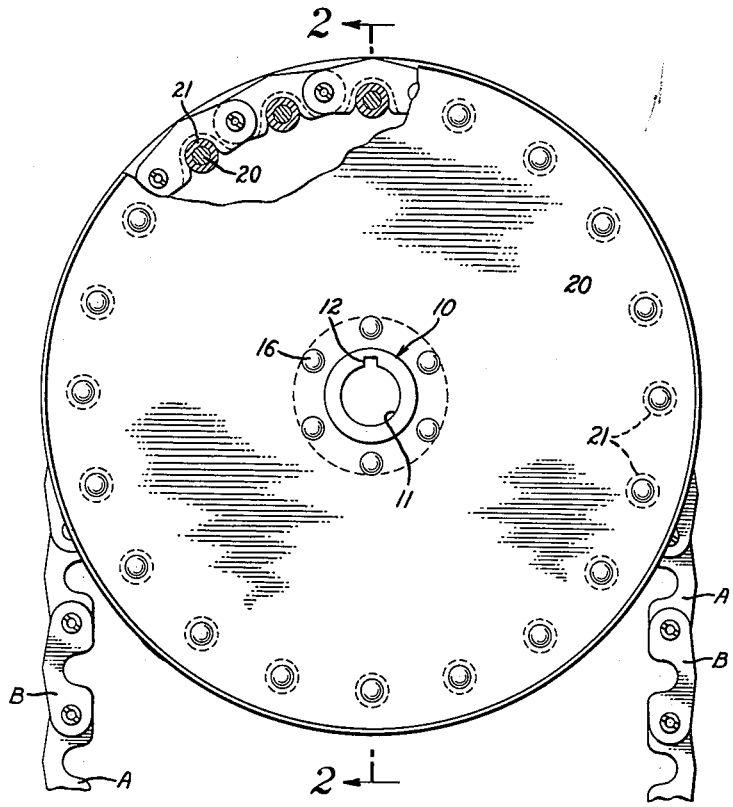
Fig. 1 is a side view of a wheel-and-chain drive embodying the present invention.
Figure 2:
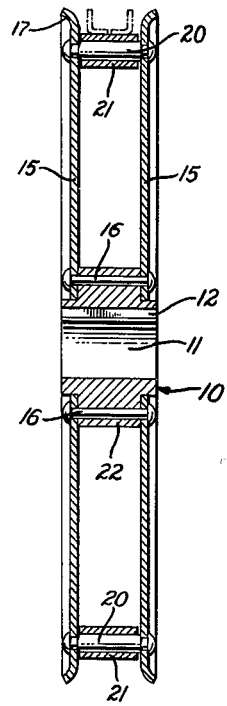
Fig. 2 is a sectional view of the wheel taken in the direction of the arrows on the section plane passing through the line 2—2 of Fig. 1.
Figure 3:
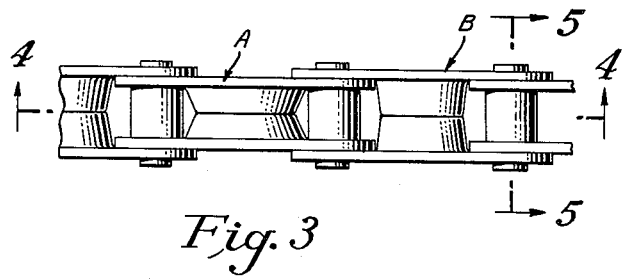
Fig. 3 is a top view on a portion of the chain.

Referring to the drawings, there is shown therein a wheel-and-chain drive embodying the present invention. Figs. 1 and 2 illustrate the wheel, and referring to said figures, said wheel comprises a hub member 10 recessed as shown at 11 for passage of a driving shaft, a key slot 12 being provided in a manner well known in the art for securing the hub member 10 to the shaft with the aid of a key. The sides of the hub member 10 are recessed and receive two side discs 15, 15 riveted to the hub member 10 with the aid of long rivets 16, 16. The discs 15, 15 are flared out around their respective peripheries as indicated at 17.

A plurality of shouldered pins 20 secure the discs 15, 15 together around their periphery, and have mounted thereon sleeves 21. The pins 20 are arranged equidistantly around the wheel. The width of the disc-receiving portion 22 of the hub member 10 and the shoulder portion of the pins 20 are of the same width and determine the width of the wheel, with the discs 15, 15 being thus rigidly secured to said hub member 10 and the pins 20. On the other hand, the sleeves 21 have sufficient clearance in their length and inside diameter thereof to permit their rotation on the pins 20. The flared out portion 17 ensures quiet running of the chain on the wheel and prevent the sides of the chain from striking against the sides of the wheel and causing rattling noise. This expedient also ensures proper guiding of the chain in entering the wheel recess.

It can be easily appreciated that the discs 15, 15 are manufactured by stamping operations from sheet material, while the sleeves 21 can be cut to proper length from suitable piping in a simple and easy manner or rolled from flat stock. The rivets 16 and the pins 20 may be manufactured from wire of suitable diameters by screw machine operations.

The sheet metal stamped chain is constructed in accordance with the present invention from units, each of which comprises two links, an inner link A and an outside link B. The inner link A consisting of two identical halves 30, 30, while the outer link B consists of two identical halves 31, 31, said halves being adapted to be assembled together in a manner described below. The link halves 30 and 31 differ from each other by the length of their formed bearing portions 31a, 30a, the outer link halves 31 having said portions slightly longer to ensure that when the edges of bearing portions 31a, 31a meet and thus determine the width of the link 31, the assembled inner link 30 will properly fit between the sides 31b, 31b of the outer link. The sides 31b, 31b and 30b, 30b of both links are flat, while the curved bearing portions 31a, 31a, and 30a, 30a are curved and are adapted to receive or cooperate with the sleeves 21 of the wheel.

Each of the flat sides 30b of the inner link A is provided with round holes 32 of a diameter adapted to receive the ends of the sleeves 33, 33 and to effect a forced fit of said ends in said holes 32.

The flat sides 31b, 31b of the outer link are provided with holes 35 of a smaller diameter for passage therethrough of pins 36, 36. It should be noted that holes 35 are of a smaller diameter than holes 32 and are equal, substantially, to the inside diameter of the sleeves 33, while the holes 32 are equal to the outside diameter of said sleeve 33.

The pins 36, 36 are solid and are cut to a greater length than the intended width of the outer link B. Said pins 36 are provided before assembly with indentations of recesses 37, 37.

For assembling my improved chain, the inner link A is first assembled by pressing the ends of the sleeves 33, 33 into holes 32, 32 of the link halves 30, 30. Such operation connects the two halves 30, 30 and two sleeves 33, 33 into a single inner link A.

Figures 4, 5:
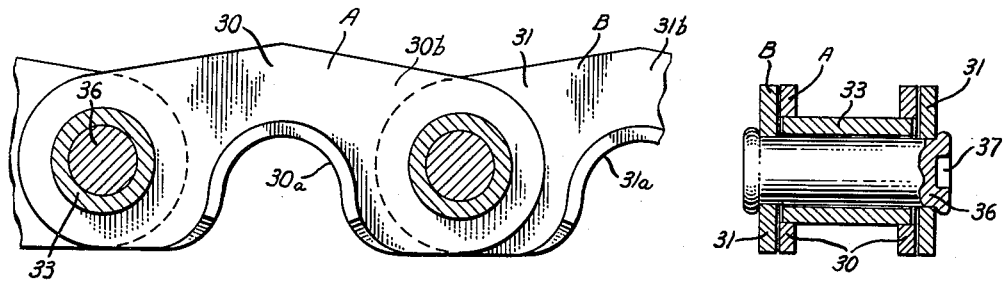
Fig. 4 is a sectional view taken in the direction of the arrows on the section plane passing through line 4—4 of Fig. 3.
Fig. 5 is a transverse sectional view taken in the direction of the arrows on the section plane passing through the line 5—5 of Fig. 3.
Figure 6:
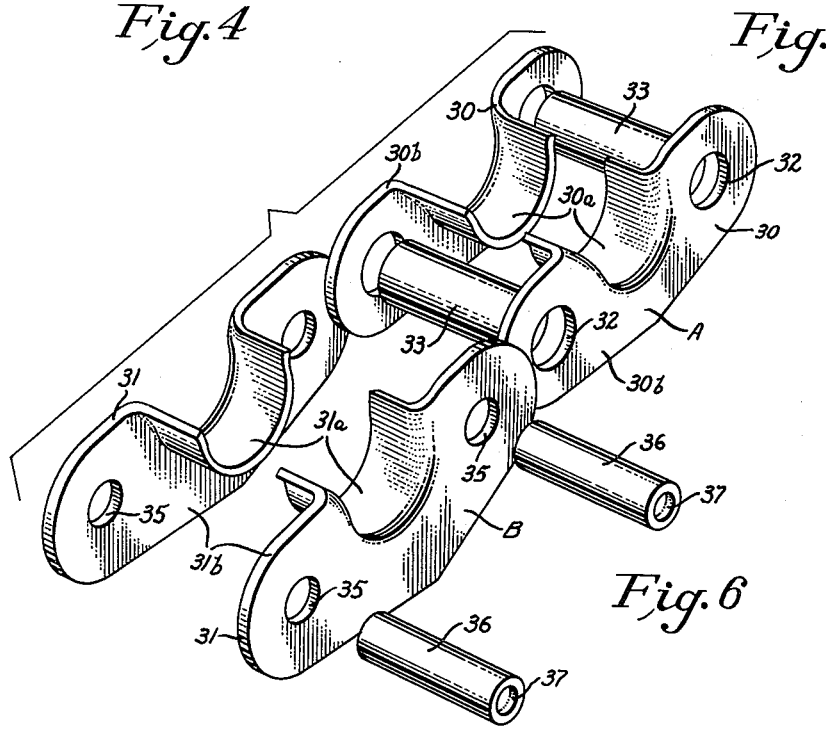
Fig. 6 is an exploded view showing all of the parts of one unit of the chain.
Figure 7:
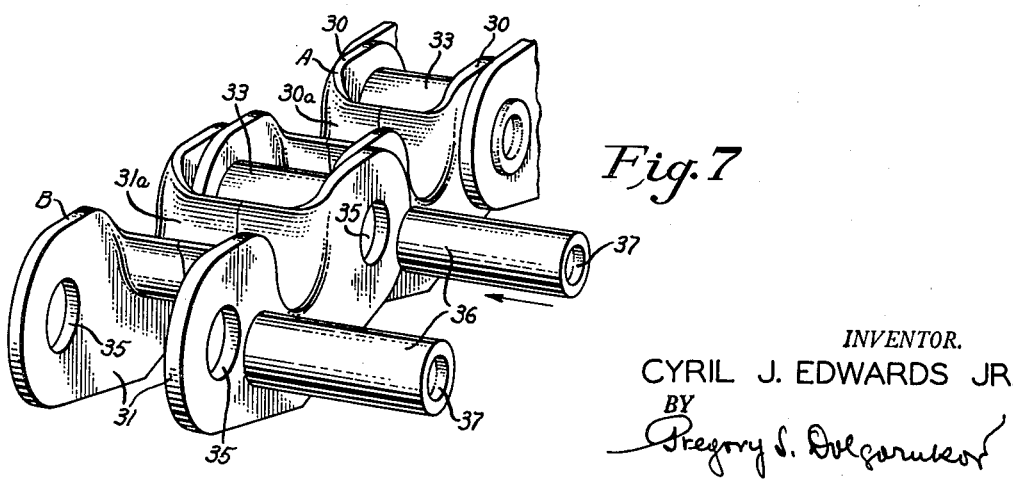
Fig. 7 is an exploded view similar in part to Fig. 6 but illustrating the method of assembling the unit of Fig. 6.

After the inner link A is thus assembled, the halves 31 of the outer link B may be placed against the sides of the inner link to have the holes 35 of said halves 31 in registry with the inner recesses of the sleeve 33. Thereupon, the pin 36 is passed through the inner recess of the sleeves 33 to bring the pin into a position to have the ends thereof protruding for equal distances on both sides of the outer link. It may be also preferable under certain conditions to insert the pins 36 in the holes 35 of one of the halves of the outer link and to pass the free ends of said pins through the inner recesses of the sleeves 33 of two inner links, and connect the other half of the outer link to such ends. Thereupon, the ends of the pins 36 are upset to have the material thereof spread sidewise as is best shown in Fig. 5 and thus to connect the link halves 31, 31 to form the outer link B and to connect one end of said link to the inner link A. Thereupon, the next inner link is similarly connected to the other end of the outer link, and the process is repeated indefinitely to produce any desired length of chain.

It will be understood under some conditions the pins such as 36 may have shoulders provided at their ends to control the width of the outer links.

I prefer to use sheet steel for manufacturing the discs 15, 15 of the wheel, and sheet steel for manufacturing the sides of the chain links. It will be understood, however, that other metals or sheet materials, such as plastic or plastic impregnated paper or fabric may also be used and, in fact, be more desirable for certain specific applications.

There is thus provided an improved wheel-and-chain drive whereby the objects of the present invention listed above and numerous additional advantages are attained.

I claim:

1. A wheel-and-chain drive including a driving chain, said chain comprising a number of units, each of said units consisting of two connected links, an inner link and an outer link, said inner link comprising two halves made of a sheet material and each having a side with two holes and a formed portion adapted to engage a cylindrical member, and two tubular members having their ends passing through said holes and fixed therein; said outer link consisting of two halves made of a sheet material and each having a side with two holes of a diameter equal substantially to the inside diameter of said tubular member and a formed portion meeting and registering with the formed portion of the other half, and a pin passed through said tubular member and said holes of the outer link and fixed in said holes to connect said two halves of the outer member as well as said inner and said outer links together.

2. The construction defined in claim 1 the ends of the pins being spread outwardly to hold the halves of the outer link between the upset ends and the ends of the tubular member, but leaving the tubular spacer member of the inner link free to rotate on said pins.

References Cited in the file of this patent

UNITED STATES PATENTS

| | | |
|---|---|---|
| 327,446 | Knowlton | Sept. 29, 1885 |
| 468,843 | St. John | Feb. 16, 1892 |
| 499,627 | Brown | June 13, 1893 |
| 511,012 | Godbery | Dec. 19, 1893 |
| 579,742 | Cottie et al. | Mar. 30, 1897 |
| 581,812 | Davies | May 4, 1897 |
| 618,642 | Clouser | Jan. 31, 1899 |
| 958,676 | Dodge | May 17, 1910 |
| 1,176,693 | Teetor | Mar. 21, 1916 |
| 1,379,507 | Alexander | May 24, 1921 |
| 1,953,388 | Bettin | Apr. 3, 1934 |
| 2,219,125 | Bremer | Oct. 22, 1940 |

FOREIGN PATENTS

| | | |
|---|---|---|
| 564,248 | France | Oct. 16, 1923 |
| 999,919 | France | Oct. 10, 1951 |